July 30, 1963 W. BEIERBACH ETAL 3,099,485
HINGE UNIT FOR SEAT WITH ADJUSTABLE BACK REST
Filed Aug. 12, 1960 11 Sheets-Sheet 6
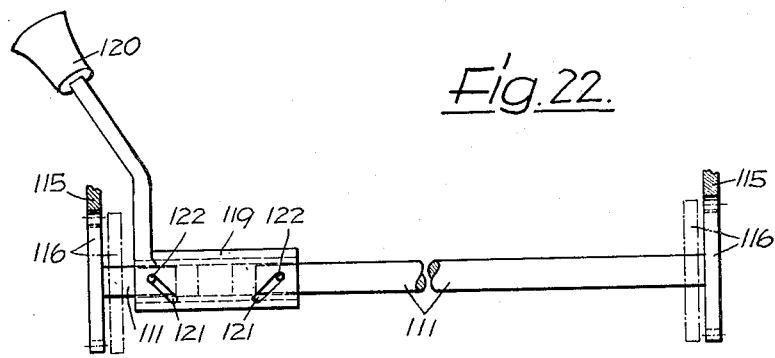
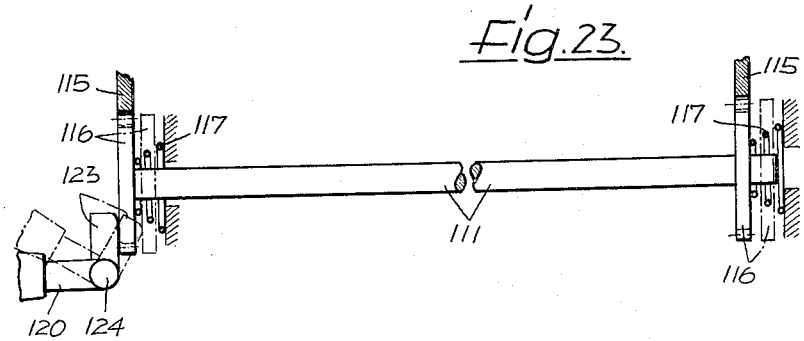
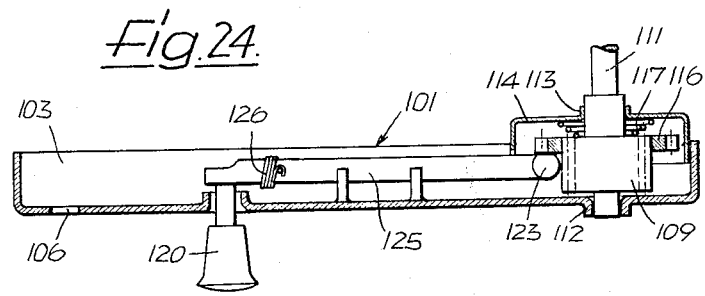
INVENTORS
WALTER BEIERBACH
SYLVESTER VON SASS
ERNST HEINL
WERNER STRIEN
BY Ernest G. Montague
ATTORNEY

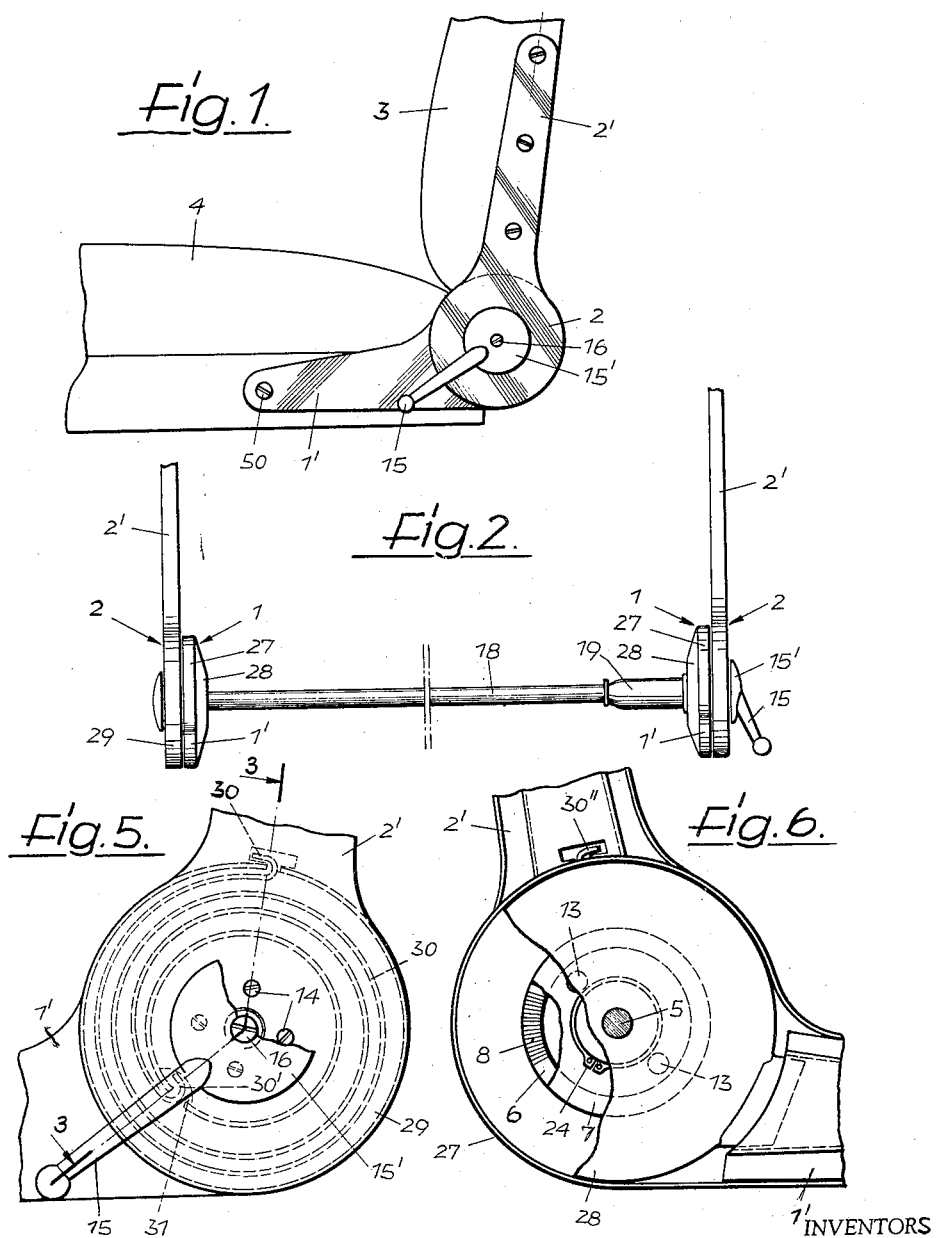

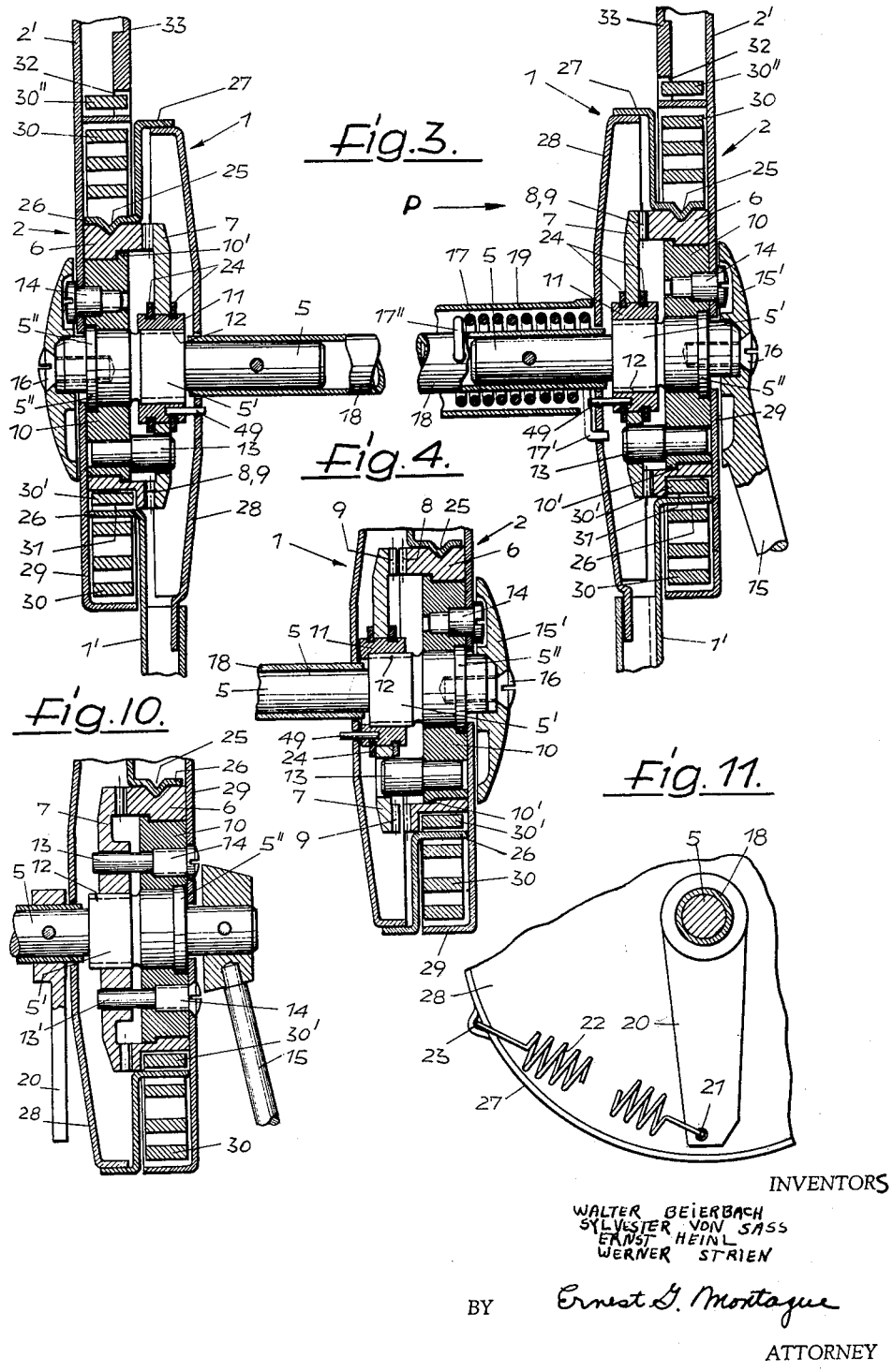

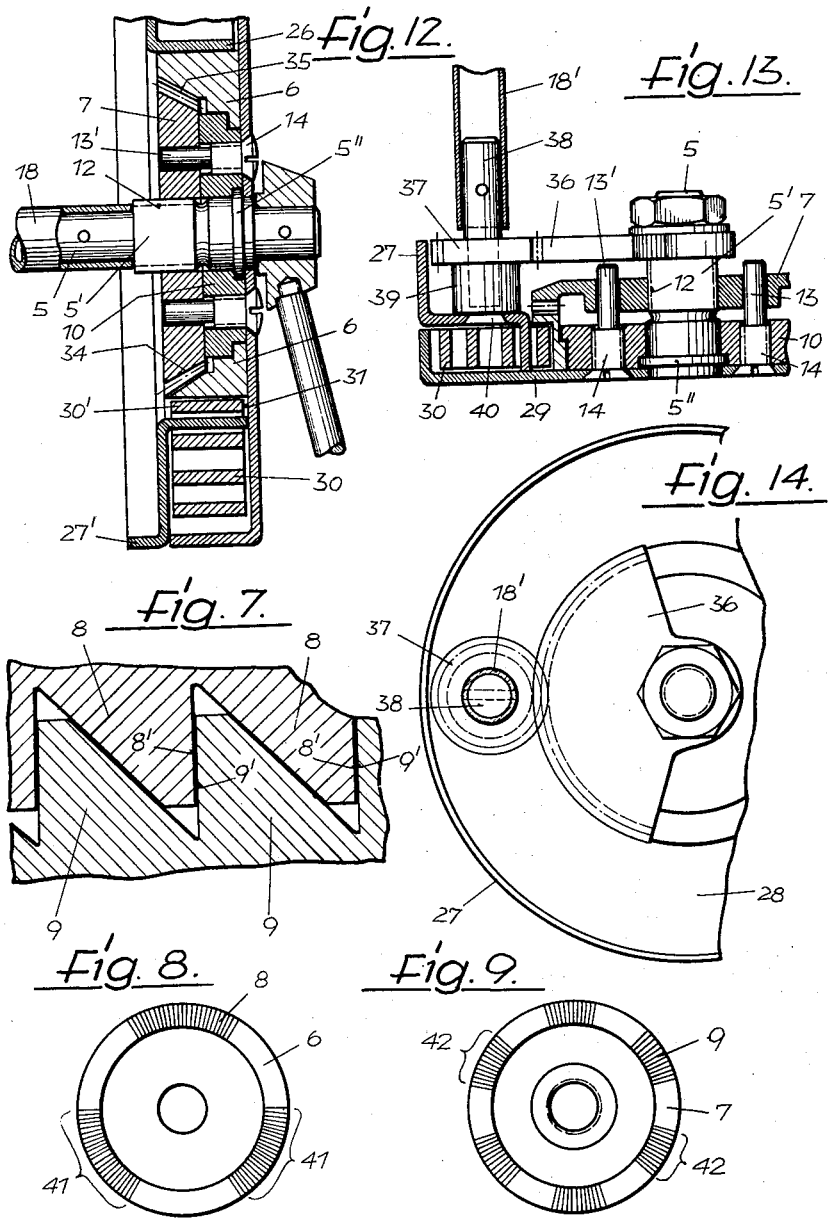

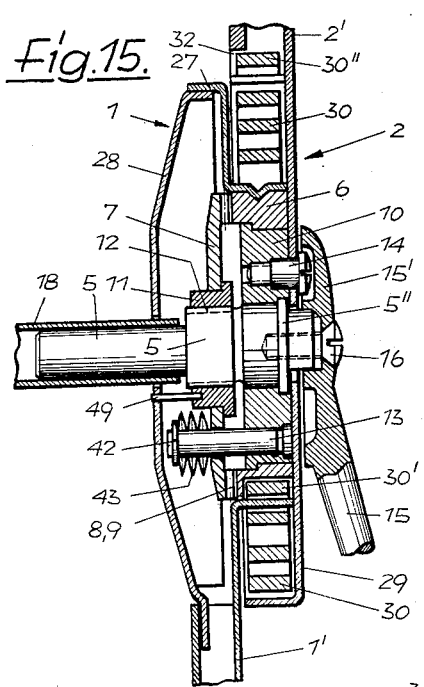
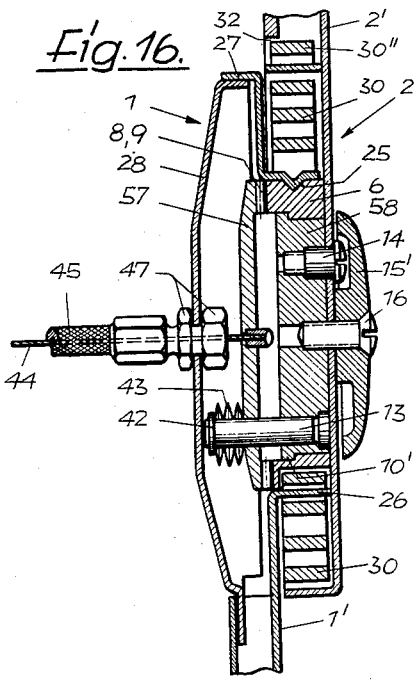
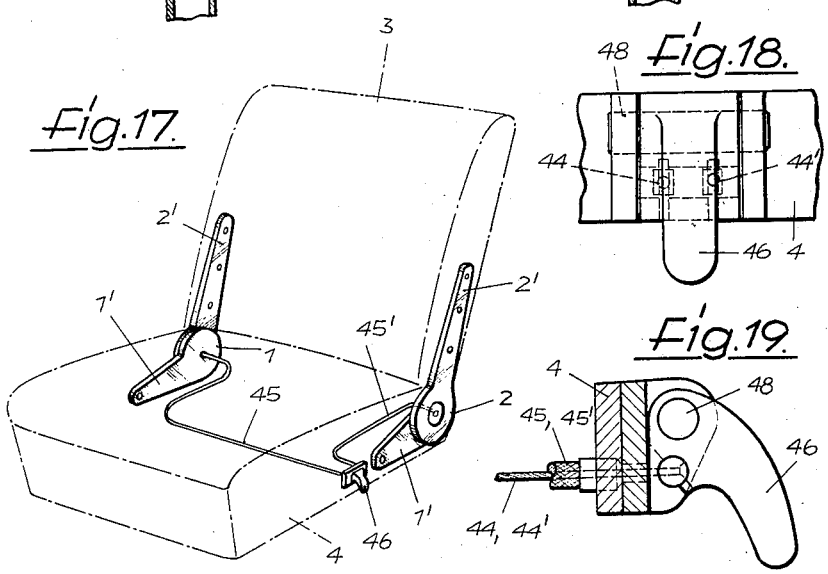
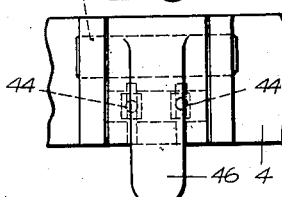
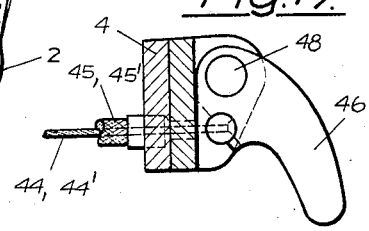

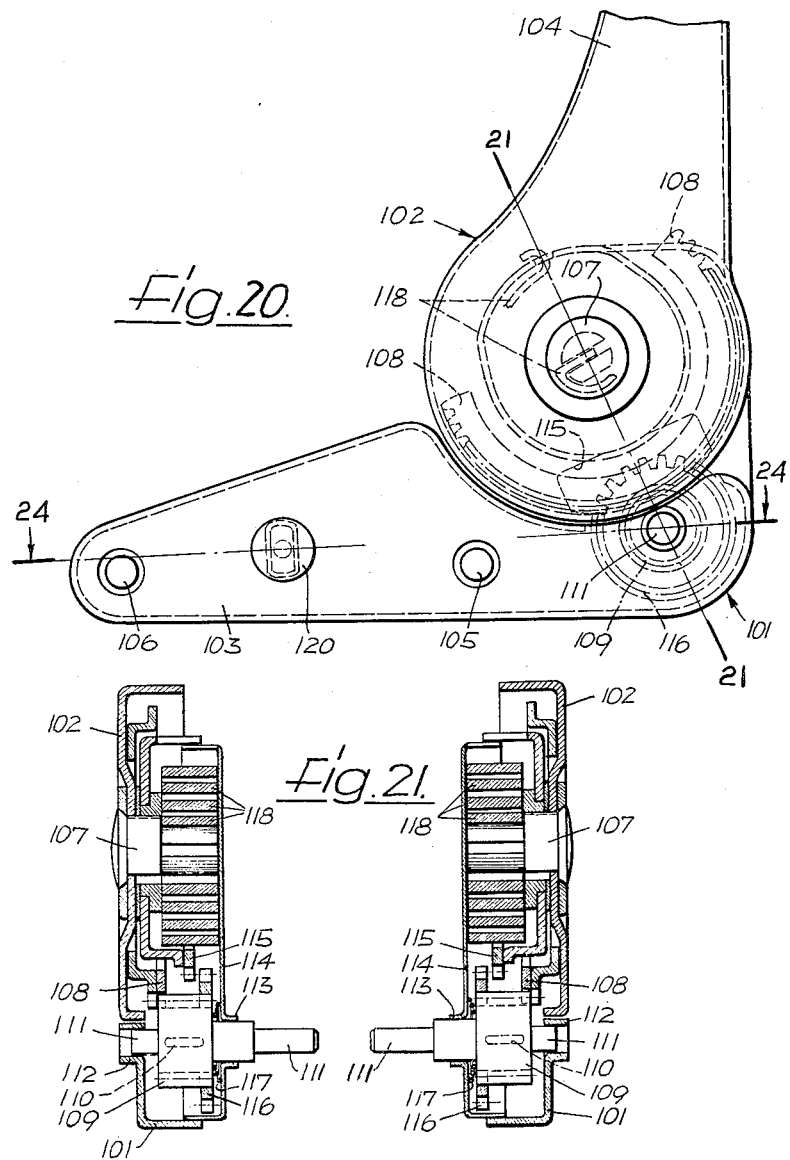

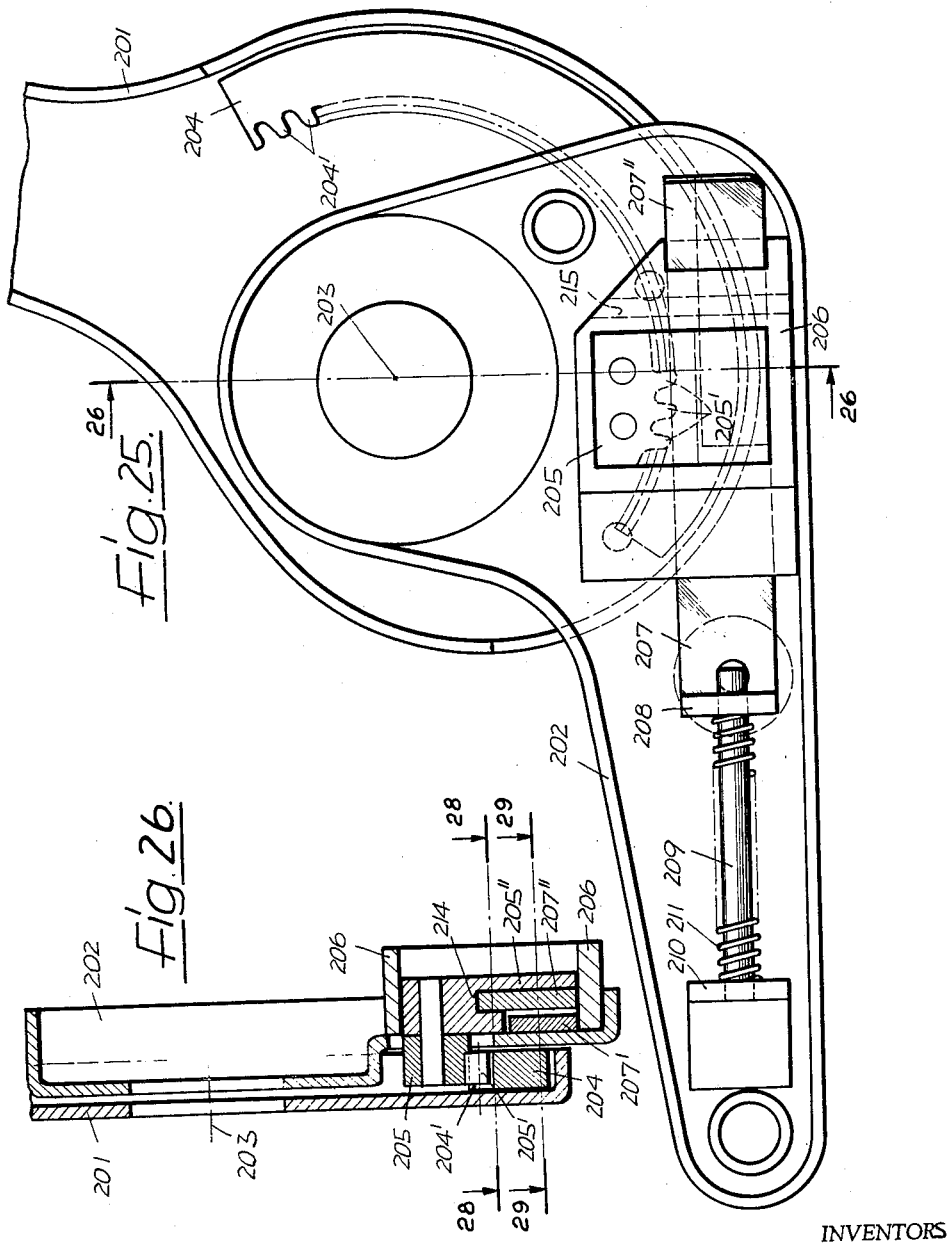

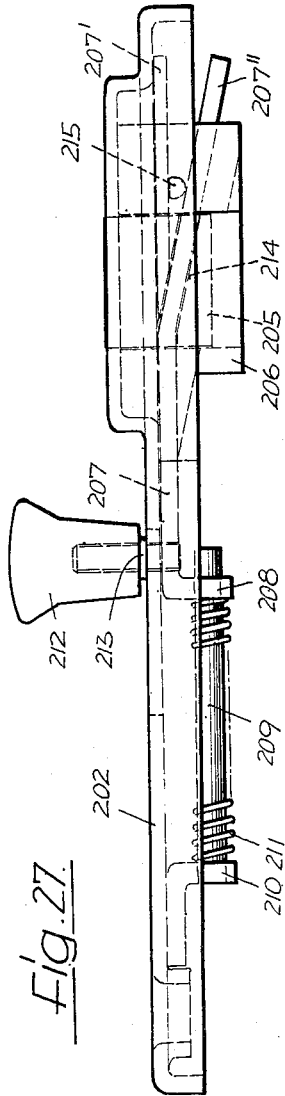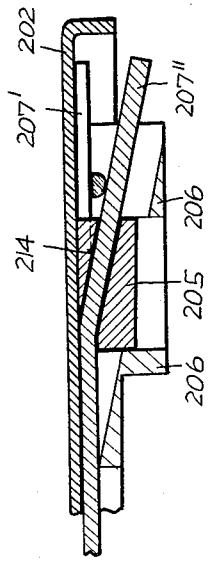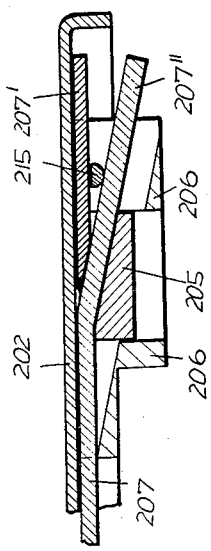

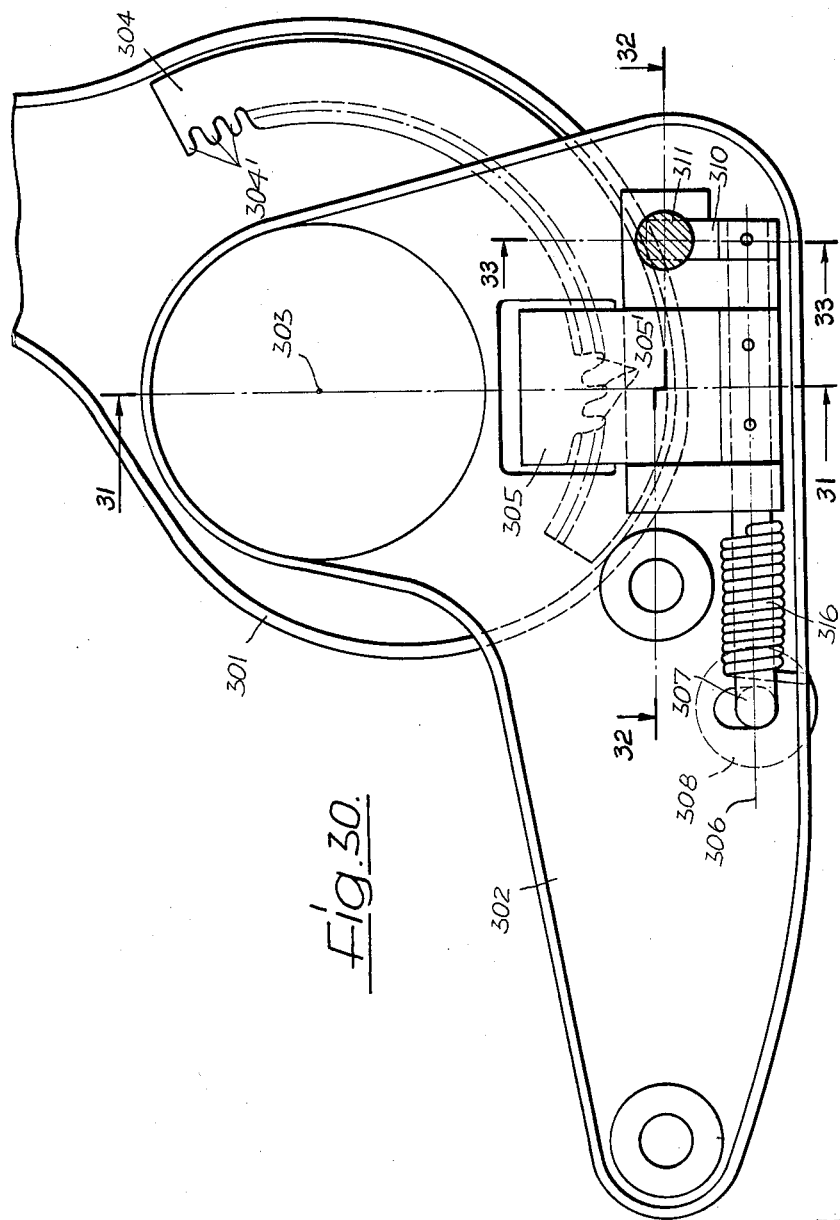

July 30, 1963 W. BEIERBACH ETAL 3,099,485
HINGE UNIT FOR SEAT WITH ADJUSTABLE BACK REST
Filed Aug. 12, 1960 11 Sheets-Sheet 10
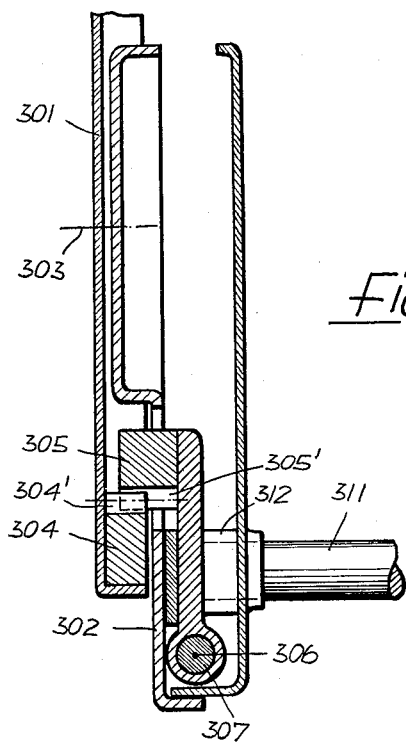
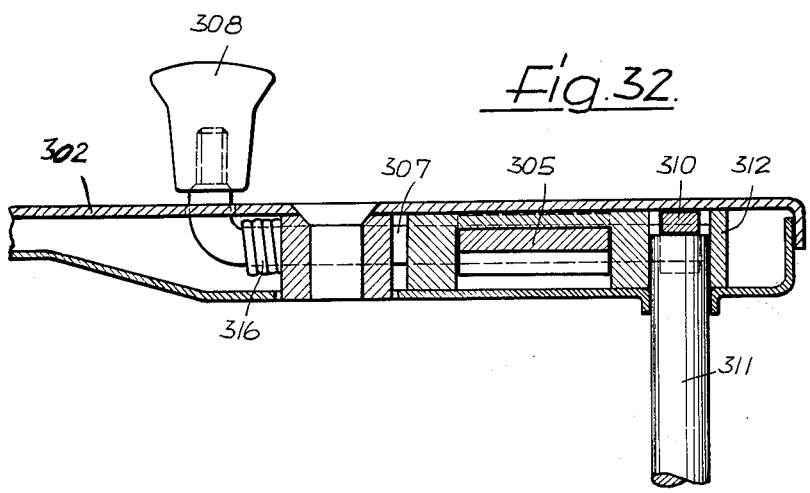
INVENTORS
WALTER BEIERBACH
SYLVESTER VON SASS
ERNST HEINL
WERNER STRIEN
BY Ernest D. Montague
ATTORNEY July 30, 1963 W. BEIERBACH ETAL 3,099,485
HINGE UNIT FOR SEAT WITH ADJUSTABLE BACK REST
Filed Aug. 12, 1960 11 Sheets-Sheet 11

INVENTORS
WALTER BEIERBACH
SYLVESTER VON SASS
ERNST HEINL
WERNER STRIEN
BY Ernest G. Montague
ATTORNEY United States Patent Office 3,099,485
Patented July 30, 1963

3,099,485
HINGE UNIT FOR SEAT WITH ADJUSTABLE
BACK REST
Walter Beierbach, Stuttgart-Weil im Dorf, Ernst Heinl, Baiersdorf, Erlangen, Werner Strien, Stuttgart-Weil im Dorf, and Sylvester von Sass, Pluderhausen, Germany, assignors to Stuttgarter Karosseriewerk Reutter & Co. G.m.b.H., Stuttgart, Germany, a corporation of Germany
Filed Aug. 12, 1960, Ser. No. 49,327
Claims priority, application Germany Aug. 25, 1959
23 Claims. (Cl. 297—373)

The present invention relates to a hinge unit for adjusting the degree of inclination of a back rest of a seat, especially of an automobile or other vehicle.

Each hinge unit of this type consists of two pairs or sets of hinge members, one member of each set being associated with the seat and the other member with the back rest. The hinge members of each pair or set are pivotably connected to each other and adapted to be locked in the adjusted position by means of two cooperating locking members. Two of these locking members, which are associated with different sets of hinge members and are connected to each other, may then be adjusted relative to the other locking members in the direction of an axial plane of the hinge set in such manner that the locking members will be engaged with or disengaged from each other.

There are various designs of hinge units of this type known in the prior art. All of these known designs have, however, contain disadvantages. Especially those hinge units in which two locking members which are associated with different sets of hinge members are adjustable relative to the other locking members in the direction of an axial plane of the hinge unit have the disadvantage that the movable locking members are rigidly connected to the associated parts of the hinge unit which in some cases are designed to form parts of the frame of the seat or of the back rest. Due to this construction, parts of the hinge unit and possibly also of the frame will easily become distorted.

It is an object of the present invention to overcome this disadvantage of the known hinge units by providing a hinge unit, the movable locking members of which are movable within an axial plane of the hinge unit independently of the associated hinge members. According to the invention, the locking members may be slidable in the axial direction of the hinge unit or parallel to such direction. In either case, the locking teeth of the locking members may be designed so that when the locking members are in engagement with each other the occurrence of any forces which act in the axial direction and tend to disengage the locking members from each other will be entirely prevented or if any such forces do occur, they will not affect the engagement of the locking members. If the locking members are of the conventional type in the form of disks with radially projecting teeth at the surfaces thereof facing toward each other, the mentioned axial forces may be avoided by designing the teeth of a shape so that one flank of each tooth will be disposed within a plane which extends through the common axis of the disks.

This same object may also be attained in a different manner which has the additional advantage that the back rest of the seat may be locked against any undesired tilting either toward the rear or in the opposite direction, that is, for example, in an automobile, in the direction in which the automobile is driven. In this event, the hinge unit will be designed so that the movable and fixed locking members of each set of hinge members will be disposed within the same plane when in the engaged position.

The movable locking members which are associated with each set of hinge members may be moved either in the same direction or in opposite directions, and this movement of each movable locking member may be effected by a movement of a cam slide which is slideable in a straight direction which intersects the axis of the hinge unit.

Instead of shifting the locking members in the axial direction of the hinge unit or parallel to such a direction, it is also possible according to the invention to move the locking members within an axial plane of the hinge unit in such a manner that the movable locking member of each set of hinge members is pivotable about an axis which intersects the axis of the hinge unit at right angles thereto. In this event, the bolt or shaft which carries the pivotable locking member of one set of hinge members and forms the axis of rotation has an arm rigidly secured thereto which acts upon the end surface of a rod which extends parallel to the axis of the hinge and is slidable in the axial direction within the two sets of hinge members. Near its other end which is slidable within the second set of hinge members this rod carries a control member which has an oblique cam surface on which another arm engages which is rigidly secured to the bolt or shaft which forms the axis of rotation of the pivotable locking member of the second pair of hinge members.

These and additional objects, features, and advantages of the present invention will become further apparent from the following detailed description thereof, particularly when the same is read with reference to the accompanying drawings, in which FIGURE 1 shows a side view of one pair or set of hinge members of a hinge unit according to the invention mounted on a seat and on a back rest;

FIGURE 2 shows a view of the hinge unit alone consisting of two pairs of hinge members as seen from the left side of FIGURE 1;

FIGURE 3 shows an enlarged cross section of the two sets of hinge members of one hinge unit according to FIGURE 2 in the locked position, but with the section of the right set of hinge members being taken along line 3—3 of FIGURE 5;

FIGURE 4 shows a partial cross section of the right set of hinge members according to FIGURE 3 in the unlocked position;

FIGURE 5 shows a side view of one set of hinge members according to FIGURES 1 to 4, which also indicates the spring for drawing the back rest to an upright position;

FIGURE 6 shows a side view, partly broken away, of one set of hinge members, as seen in the direction of the arrow P in FIGURE 3;

FIGURE 7 shows a cross section of the locking teeth;

FIGURES 8 and 9 show front views of the gear segments on the two disks;

FIGURE 10 shows a partial cross section of a modification of a set of hinge members according to FIGURES 1 to 9;

FIGURE 11 shows a partial side view of FIGURE 10;

FIGURE 12 shows a partial cross section of a second modification of a set of hinge members according to FIGURES 1 to 9;

FIGURE 13 shows a partial cross section of a third modification of a set of hinge members according to FIGURES 1 to 9;

FIGURE 14 shows a diagrammatic partial side view of FIGURE 13;

FIGURE 15 shows a partial cross section of a fourth modification of a set of hinge members according to FIGURES 1 to 9;

FIGURE 16 shows a partial cross section of a fifth modification of a set of hinge members according to FIGURES 1 to 9;

FIGURE 17 shows a diagrammatic perspective illustration of two sets of hinge members according to FIGURE 16 and of two Bowden cables which are associated therewith;

FIGURE 18 shows a side view of the device for operating the Bowden cables according to FIGURE 17;

FIGURE 19 shows a cross section of the device according to FIGURE 18;

FIGURE 20 shows a side view of one set of hinge members of a hinge unit according to a second embodiment of the invention;

FIGURE 21 shows a cross section taken along line 21—21 of FIGURE 20;

FIGURE 22 shows a diagrammatic illustration of the operation of two locking members according to FIGURE 21 which are movable axially in opposite directions to each other;

FIGURE 23 shows another diagrammatic illustration similar to FIGURE 22 but for operating two locking members according to a modification of FIGURE 20, which are movable axially in the same directions;

FIGURE 24 shows a cross section of the operating means according to FIGURE 23 taken along a line 24—24 in FIGURE 20;

FIGURE 25 shows a side view of a set of hinge members of a hinge unit according to a third embodiment of the invention, as seen from the center of the seat, but without the covering of the hinge members;

FIGURE 26 shows a cross section taken along line 26—26 of FIGURE 25;

FIGURE 27 shows a plan view of the hinge member according to FIGURE 25 which is associated with the seat;

FIGURE 28 shows a cross section taken along line 28—28 of FIGURE 26;

FIGURE 29 shows a cross section taken along line 29—29 of FIGURE 26;

FIGURE 30 shows a side view of a set of hinge members of a hinge unit according to a fourth embodiment of the invention, as seen from the center of the seat, but without the covering of the hinge members;

FIGURE 31 shows a cross section taken along line 31—31 of FIGURE 30;

FIGURE 32 shows a cross section taken along the 32—32 of FIGURE 30 of the hinge member which is associated with the seat;

Figure 33:
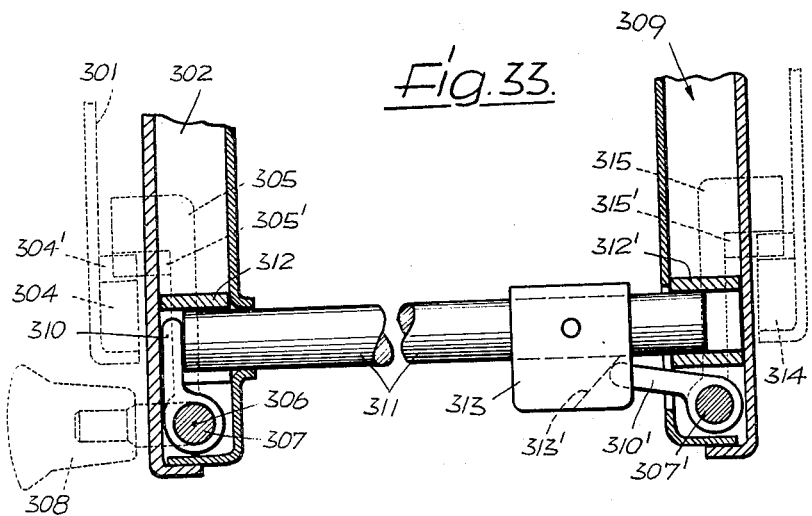
Figure 34:
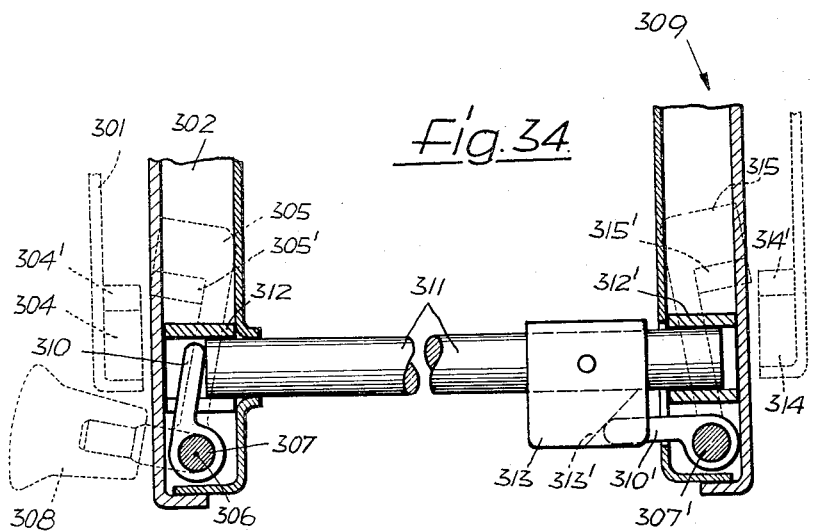

FIGURE 33 shows a cross section taken along line 33—33 of FIGURE 30 of the hinge member of one set which is associated with the seat and a similar cross section of the corresponding hinge member of the second set, and it indicates the locking members in the locked position; while FIGURE 34 shows two cross sections similar to those of FIGURE 33, but in which the locking members are indicated in the unlocked position.

Referring now to the drawings, and first particularly to FIGURES 1 to 6, the hinge unit according to the first embodiment of the invention consists of two pairs or sets of hinge members 1 and 2. One hinge member 2 of each set is connected by means of its arm 2' to the frame of the back rest 3, while the other hinge member 1 of each set is connected by means of its arm 1' either rigidly or pivotably at 50 to the frame of the seat 4. The two hinge members 1 and 2 of one set are pivotably connected to each other by a bolt 5, and the two bolts 5 of the two sets of hinge members are rigidly connected to each other by a pipe 18. Each set of hinge members 1 and 2 is provided with two locking members for locking the hinge members of the respective set to each other. These locking members of each set of hinge members are formed by two disks 6 and 7. Disk 6 is connected to hinge member 1 which in turn is connected to seat 4, while the other disk 7 is connected to hinge member 2 which in turn is connected to the back rest 3. Disks 6 and 7 are provided at their sides facing toward each other with friction surfaces or radially extending teeth 8 and 9. The cross-sectional shape of these teeth 8 and 9 is illustrated in FIG. 7. One flank 8' or 9' of each tooth 8 or 9, respectively, lies within a plane passing through the axis of bolt 5.

FIGS. 8 and 9 illustrate that teeth 8 and 9 of disks 6 and 7 are provided in the form of gear segments 41 and 42, respectively, and that the length of the arc of each gear segment 41 of disk 6 differs from that of each gear segment 42 of disk 7. As already indicated, instead of gear segments it is also possible to provide the disks 6 and 7 with segments forming friction surfaces or with annular friction surfaces.

Disks 6 and 7 of each set of hinge members are movable relative to each other in the direction of their common axis and they are adapted to be locked to each other in the adjusted position. Thus, the friction surfaces or the teeth 8 and 9 of disks 6 and 7 may be engaged with or disengaged from each other. Disk 6 which is rigidly connected to seat 4 by the hinge member 1 is provided with a hub, hereafter called the rotary hub 10, which is rotatable within disk 6 and on bolt 5, but not slidable in the axial direction, and which is rigidly secured to the back rest 3 by means of screws 14 in hinge member 2. The hub on the other disk 7 is formed by a nut 11 which has screw threads 12, preferably multiple coarse threads, which are screwed upon the corresponding threads of a part 5' of bolt 5. Disk 7 is locked against rotation relative to the rotary hub 10, for example, by a plurality of pins 13 which extend parallel to the axis of bolt 5 and are mounted in the rotary hub 10 so as to be slidable within coaxial bores in disk 7, as shown particularly in FIGS. 3 and 4. The rotary hub 10 further has a covering member 29 secured thereto by screws 14.

At one side of seat 4, bolt 5 is provided with a handle 15, one end of which forms a cover plate 15' which is secured to the outer end of bolt 5 by means of screw 16. Bolt 5 and the hinge member 1 which is secured to seat 4 are connected to each other by a return spring which tends to return bolt 5 to its original position. In the embodiment according to FIG. 3, this return spring consists of a torsion spring 17, one end 17' of which is hooked into an aperture in hinge member 1, while its other end 17" is hooked either into bolt 5 itself or, as illustrated, into pipe 18. This return spring 17 is preferably enclosed by a rubber sleeve 19.

In order to prevent disk 7 during an adjustment of the back rest 3 from engaging with disk 6 before the adjustment has been completed, disk 7 is rotatably mounted on nut 11 and fixed thereon in the axial direction by spring rings 24, while nut 11 is prevented from rotating relative to hinge member 1 by a pin 49.

As may be seen particularly in FIG. 3, the rotary hub 10 is secured against axial movement relative to bolt 5 by a flange 5" on bolt 5, while disk 6 is secured against axial movement by a flange 10' of the rotary hub 10. Disk 6 on the rotary hub 10 carries a collarlike hub 26 of a two-part casing 27, 28 which forms the hinge member 1 and encloses disk 7. Hub 26 is secured to disk 6, for example, by indentations 25. The collarlike hub 26 is surrounded by a cup-shaped member 29 which is open toward hub 26 and secured to the rotary hub 10 by means of screws 14. This cup-shaped member 29 forms the hinge member 2 and has a diameter equal to that of casing 27, 28. The space between hub 26 and the cup-shaped member 29 contains a torsion spring 30 which tends to pull the back rest 3 in the upward direction. As shown in FIGS. 3, 5, and 6, one end 30' of this spring 30 is hooked into a slot 31 in the collarlike hub 26, while its other end 30" is hooked into a slot 32 in a rib 33 on arm 2'.

The modifications according to FIGS. 10 to 19 do not differ in principle but only in some of their details from the embodiment of the invention according to FIGS. 1 to 9.

Thus, for example, it is possible as illustrated in FIGS.

10 to 13, to combine pins 13, which are secured to the rotary hub 10 and on which disk 7 is slidable, with the screws 14 by providing the latter with extensions 13'.

Return spring 17 may also be replaced by a differently arranged spring, as shown in FIGS. 10 and 11. In this case, an arm 20 is rigidly secured to bolt 5 or pipe 18, and one end of a return spring 22 is hooked at 21 into an aperture in the free end of this arm, while the other end of the spring is hooked at 23 into hinge member 1.

FIG. 12 shows another modification in which the locking members 6 and 7 are provided with bevel-gear teeth in place of the radial teeth 8 and 9 as shown in the embodiment according to FIGS. 3 to 9. Disk 7 has external bevel teeth 34 and disk 6 has internal bevel teeth 35.

According to the modifications as shown in FIGS. 13 and 14, the connecting pipe 18' between the two sets of hinge members of one seat does not extend coaxially with bolts 5, since this may in some cases not be possible because of the particular seat construction. Instead, bolt 5 carries a gear segment 36 which is in mesh with a pinion 37, the shaft 38 of which carries pipe 18' and is rotatably mounted in a bearing 39 which may be secured to the casing part 27, for example, by means of a screw 40.

The modifications according to FIGS. 15 and 16 differ from the embodiments of the invention according to FIGS. 1 to 14 in that in place of spring 17 in FIG. 3 or of spring 22 in FIG. 11 compression springs 43, preferably cup springs, are used which are mounted on pins 13 and act at one side upon disk 7 and at the other side upon washers 42 which are secured on pins 13 and may, for example, consist of snap rings.

The further modification according to FIGS. 16 to 19 differs from the embodiments as previously described by the fact that the movements of disks 6 and 7 relative to each other in the axial direction are not produced by means of screw threads 12 but by means of a Bowden cable. For this purpose, disk 57 is slidable merely on pins 13 which are rigidly secured to disk 58, and it is pressed against disk 58 by springs 43 which are mounted on pins 13. At its center, disk 57 is secured to the center wire 44 of a Bowden cable, the flexible outer conduit 45 of which is secured to hinge member 1 by a pair of nuts 47. As illustrated in FIG. 17, each pair of hinge members of one hinge unit for one seat 4 is provided with a separate Bowden cable. The other ends of the Bowden cables are connected to a lever 46 which is pivotably mounted at one side of seat 4, and for this purpose the outer conduits 45 and 45' are secured to the seat, while the center wires 44 and 44' are secured to lever 46 at points which are disposed eccentrically to the pivot 48 of lever 46. Thus, by manipulating lever 46, both sets of hinge members of one seat 4 may be operated simultaneously.

The operation of the hinge unit, as apparent particularly from FIGS. 3 and 4, is as follows:

In the position as indicated in FIG. 3, the locking teeth 8 and 9 of disks 6 and 7 are in engagement with each other and the back rest 3 is therefore locked against any pivotal movement. If the back rest is to be pivoted after teeth 8 and 9 have been disengaged from each other, this may be done either by hand or by leaning against it, and this movement is carried out in the upward direction by the assistance of torsion spring 30 and in the downward direction against the action of spring 30. In order to disengage the locking teeth, lever 15 is turned for a part of one revolution, whereby bolt 5 will be turned and nut 11, which is nonrotatable because of pin 13 or pin 49, will be shifted in the axial direction until teeth 8 and 9 are disengaged from each other, as indicated in FIG. 4. While lever 15 is thus being actuated by one hand, back rest 3 must be grasped by the other hand or be pivoted by leaning against it. After back rest 3 has thus been adjusted to the desired angular position, lever 15 is released and will then be returned by spring 17 or 22 to its original position. By the same movement, nut 11 will also be moved in the axial direction and returned to its original position, as shown in FIG. 3. The movement of lever 15 and thus the rotaton of bolt 5 is transmitted by pipe 18 to the bolt of the set of hinge members at the other side of the seat so that these hinge members are operated in the same manner.

In the embodiments of the invention as illustrated in FIGS. 20 to 34, the movable locking members may be moved within an axial plane of the hinge unit in such a manner that the slidable and the nonslidable locking members of each set of hinge members will in their engaging position be disposed within a plane which extends vertically to the axial plane of the hinge unit.

The embodiments according to FIGS. 20 to 24, according to FIGS. 25 to 29, and according to FIGS. 30 to 34 differ from each other merely by the different kinds of movement and by the different actuation of the movable locking members.

According to FIGS. 20 to 24, the hinge unit consists of two pairs or sets of hinge members 101 and 102. One hinge member 102 of each set is rigidly connected by its arm 104 to the frame of the back rest, while the other hinge member 101 is connected by its arm 103 to the frame of the seat either rigidly at 105 and 106 or pivotably only at 106. The two hinge members 101 and 102 are pivotably connected to each other by a bolt 107. In the particular embodiment as illustrated, the hinge member 102 which is connected to the back rest is provided with a gear segment 108 with external teeth which are in mesh with the teeth of a pinion 109 which is rigidly secured, for example, by a key 110 to a shaft 111 which is axially slidable in hubs 112 and 113 on hinge member 101 and on a cover 114, respectively, which covers the respective pair of hinge members in the direction toward the seat. Hinge member 101 which is to be mounted on the seat also has a curved gear rack with internal teeth secured thereto which forms the fixed locking member 115.

Pinion 109 is rigidly secured to a disk which has a gear rim thereon and forms the other, axially movable locking member 116. Gear segment 108, pinion 109, locking member 115 which is formed by the rack, and locking member 116 which is formed by the disk with the gear rim are designed and arranged so that, when shaft 111 is shifted axially in one or the opposite direction, locking member 116 will engage with or disengage from locking member 115, while pinion 109 because of its width will remain constantly in mesh with gear segment 108 during the shifting movements in the axial direction as well as in the two end positions. A conical spring 117 which surrounds shaft 111 and is mounted between cover 114 and locking member 116 maintains locking member 116 in engagement with locking member 115. FIG. 21 illustrates the locking members 115 and 116 in the disengaged position.

Shafts 111 of the two sets of hinge members 101 and 102 are nonrotatably connected to each other in such a manner that, when one shaft 111 is shifted in the axial direction, both shafts will be shifted either in the same direction or in opposite directions, as will be subsequently described. According to the modification as shown in FIG. 21, locking members 115 and 116 when in the disengaged position will be disposed symmetrically to the central plane of the seat extending vertically in the direction of movement of the vehicle so that shafts 111 must be moved in opposite directions in order to move locking members 116 into the engaged or locking position. Pinions 109 remain, however, in mesh with gear segments 108 of hinge members 102 which are associated with the back rest also in the unlocked position. In this position, the back rest may be pivoted relative to the seat. The back rest is acted upon in the usual manner by a coil spring 118 which tends to pivot the back rest upwardly or forwardly in the direction in which the vehicle is driven. Since the two pinions 109 of the two sets of hinge members 101 and 102 are nonrotatable relative to each other, the two hinge members 102 which are connected to the back rest will always be disposed at the same angle relative to the horizontal or vertical planes so that the back rest will not be subjected to any torsion. When locking members 115 and 116 of both sets of hinge members 101 and 102 are moved into engagement with each other, the back rest will be locked in a fixed position.

FIG. 22 illustrates diagrammatically the manner in which the shafts 111 of two sets of hinge members 101 and 102 may be moved in opposite directions. One of the shafts 111 is extended to the operating side of the seat where both shaft ends are slidably mounted in the axial direction within a rotatable but axially nonslidable sleeve 119, terminating therein at a certain distance from each other. Sleeve 119 is rotatable by means of a hand lever 120 and has in its peripheral wall a pair of cam slots 121 which are inclined in opposite directions to each other. Each shaft 111 has a pin 122 secured thereto which extends radially therefrom into one of cam slots 121 in which it is slidable in the direction of the slot. Thus, when sleeve 119 is turned by means of hand lever 120 in one direction about the common axis of shafts 111, the opposite ends of the shafts will be drawn toward each other, whereby the locking members 116 of both pairs of hinge members will be disengaged from the locking members 115.

According to the modification as illustrated diagrammatically in FIG. 23, locking members 115 and 116 are mounted asymmetrically to the vertical central plane of the seat. In this event, shafts 111 may consist of a single element or they may be rigidly connected to each other since they must be shifted equally in the same axial directions. In principle, it will therefore suffice if for disengaging the locking members 115 and 116 a pressure is exerted in the axial direction upon the common shaft 111 of locking members 116 against the action of one or two springs 117, for example, by means of a cam 123 or the like which is pivotable by means of a hand lever 120 about an axis 124 and which will then exert an axial pressure upon one locking member 116.

FIG. 24 illustrates the operating means for moving shaft 111 according to FIG. 23. Cam 123 which is adapted to act upon locking member 116 is mounted on the end of a bolt 125 which is pivotally mounted on hinged member 101 and is acted upon by a torsion spring 126 in such a manner that cam 123 will not act upon locking member 116 so that the latter will under the action of spring 117 be in engagement with locking member 115. If bolt 125 is turned about its axis by hand lever 120 against the action of torsion spring 126, cam 123 will press upon locking member 116 against the action of the conical spring 117 and thereby disengage locking member 116 from the other locking member 115.

The embodiment of the invention as illustrated in FIGS. 25 to 29 is provided with a different device for operating the axially slidable locking members, namely, by means of a cam slide mechanism. Each of the two pairs of hinge members which are mounted at both sides of a seat consists of a member 201 which is to be mounted on the back rest of a seat, a member 202 which is to be mounted on the seat, and a pivot 203 connecting both members. Hinge member 201 which is connected to the back rest has a gear segment 204 with internal teeth 204' secured thereto which extends concentrically to the pivot axis 203 and forms the fixed locking member into which a pawl is adapted to engage which is mounted on the other hinge member 202 on the seat and which is provided with several teeth 205 and forms the slidable locking member 205. Due to a movement of an actuating element in a direction of a straight line which intersects the axis 203 of hinge members 201, 202, at a right angle thereto this locking member 205 is slidable in a direction parallel to the axis of gear segment 204. For this purpose, locking member 205 is guided in a guide member 206 which extends parallel to the axis 203 of gear segment 205 and is made of a U-shaped cross section, as shown particularly in FIG. 26, with the one arm 205'' being made of a greater length than the other arm. Between the two arms of this U-shaped gear segment 205 a channel 214 is formed which extends at an inclined angle to the straight line which intersects the axis 203 of hinge members 201, 202 at a right angle thereto, as may be seen particularly in FIG. 29. Locking member 205 may be shifted by a slide member 207 in a direction parallel to the axis 203, while the slide member 207 itself is slidable in the direction of a straight line which intersects axis 203 at a right angle thereto. The end of this slide member 207 which faces away from locking member 205 is bent at a right angle to form an eye portion 208 which is slidable along a bolt 209 which is secured to hinge member 202 by an angle piece 202 and extends in the direction of the straight line which intersects the axis 203 at a right angle. Bolt 209 carries a compression spring 211 between angle piece 210 and eye portion 208. Near eye portion 208, slide member 207 is provided with a handle 212, the shaft 213 of which is slidable within a slot in hinge member 202. The end portion of slide member 207 facing toward locking member 205 is bifurcated and, while one arm 207' extends in the same straight direction as the main part of the slide member, the other arm 207'' is inclined thereto at an angle which corresponds to the angle in which the channel 214 extends through the locking member 205. A guide pin 215 which is disposed between arms 207' and 207'' and extends vertically thereto holds and guides slide member 207 along the wall of housing 202.

When handle 212 is moved against the action of spring 211 toward the left, as seen in FIG. 27, the inclined arm 207'' of slide member 207 will be drawn into channel 214 of locking member 205, whereby the latter will be moved parallel to the pivot axis 208, that is, toward the right as seen in FIG. 26 and downwardly as seen in FIGS. 28 and 29. If handle 212 is again released, locking member 205 will again return to its locking position.

The further embodiment of the invention is illustrated in FIGS. 30 to 34, differs from the embodiments previously described by the fact that the movable locking members are pivotable within an axial plane of the hinge unit, that is, about an axis which intersects the axis of the hinge unit at a right angle thereto.

The hinge unit according to FIGS. 30 to 34 consists of a hinge member 301 which is to be connected to the back rest of a seat, a hinge member 302 which is to be connected to the seat, and of the conventional means of connecting these two members to each other so as to be pivotable about an axis 303. Concentrical to axis 303, the hinge member 301 has a gear segment 304 with internal teeth 304' secured thereto which forms the fixed locking member and with which the movable locking member 305 which is associated with the seat is adapted to engage which is provided with several teeth 305'. This locking member 305 is pivotable about an axis 306 which intersects the axis 303 of the hinge set at a right angle thereto and also forms the axis of a bolt 307 which is rotatably mounted on hinge member 302 and on which the locking member 305 is nonrotatably secured. Bolt 307 has a radially projecting handle 308 thereon and also carries and is acted upon by a torsion spring 316 which tends to move locking member 305 into engagement with gear segment 304. Thus, by pressing or pulling on handle 308 which is placed laterally of the seat, the back of the seat may be either locked to or unlocked from the seat.

Since locking member 305 is not pivoted within the plane of gear segment 304, as this is done in the conventional hinge units, but about an axis 306 which intersects the axis of hinge unit and thus also the axis of gear segment 304 at a right angle thereto, so that it is movable practically coaxially with gear segment 304, the back rest may be equally locked in both directions of the tilting movement of the back.

In order to prevent any distortion of the back rest, the second pair of hinge members 309 at the other side of the seat is designed symmetrically to the first pair and likewise provided with a gear segment 314 with teeth 314' and with a locking member 315 with teeth 315' which is rigidly secured to a bolt 307' which is rotatably mounted on the part of the hinge members 309 which is associated with the seat. For transmitting the movements which are imparted to bolt 307 and thus to the locking member 305 also to bolt 307' and locking member 315, an arm 310 is rigidly secured to bolt 307 so as to act upon the end surface of a rod 311 which extends parallel to the axis 303 of gear segments 304 and 314 and is slidable in the axial direction by being slidably mounted in guide bushings 312 and 312' in hinge member 302 and in the part of hinge members 309 which is associated with the seat. Guide bushing 312 is provided at its lower side with a slot through which the arm 310 is inserted. Near the other end of rod 311 which is guided in bushing 312' of the second set of hinge members 309, a control member 313 is secured to rod 311. This control member 313 is provided with an inclined cam surface 313' on which the arm 310' of hinge members 309 engages. The manner in which the movements are transmitted from the hinge and locking members at the left side of the seat to those at the right side thereof will be evident from FIGS. 33 and 34.

In all other respects, the hinge unit according to FIGS. 30 to 34 is designed in the same manner as already described with reference to the other embodiments of the invention.

Although our invention has been illustrated and described with reference to the preferred embodiments thereof, we wish to have it understood that it is in no way limited to the details of such embodiments, but is capable of numerous modifications within the scope of the appended claims.

We claim:

1. A hinge unit for a seat with a pivotably adjustable and lockable back rest comprising two sets of hinge members adapted to be secured to the two sides of a seat and a back rest forming two parts, one of said members of each of said sets adapted to be secured to one of said parts and the other of said members to the other of said parts, pivoting means for connecting said two members of each of said sets so as to be rotatable but axially immovable relative to each other, said pivoting means of both of said sets extending coaxially to each other, two pairs of disks mounted coaxially to each other, said disks of each of said pairs having teeth radially arranged at the sides of said disks facing toward each other, the first of said disks of each of said pairs being rigidly secured to the first of said hinge members of each of said sets, first means for connecting the second disk of each of said pairs to said first hinge member so as to be substantially monrotatable relative thereto, said connecting means including a nut forming a hub supporting said second disk of each of said pairs and means for connecting said second disk to said nut so as to be axially immovable relative thereto and to be rotatable relative thereto only if a strong rotary force is exerted upon said nut, a pair of rotary hubs each rotatably mounted in a bore in said associated first disk and rigidly secured to said second hinge member associated with said second disk, second means for connecting said second disk so as to be axially slidable but nonrotatable relative to said first hinge member, a pair of bolts each rotatably mounted in a bore in said associated rotary hub so as to be axially immovable relative thereto and each having coarse screw threads, each of said nuts being screwed on one of said bolts, means for rigidly connecting said bolts to each other, a handle secured to one end of one of said bolts for turning the same, and at least one return spring for turning both of said bolts back to their original position after said bolts have been turned by said handle against the action of said spring.

2. The hinge unit, as set forth in claim 1, in which said first connecting means comprise a plurality of pins mounted on the rotary hub of the first of said disks of each of said pairs and extending parallel to the axis of one of said bolts and slidably guided within corresponding bores in the second disk of each of said pairs.

3. The hinge unit, as set forth in claim 2, further comprising screws for rigidly securing said rotary hub of said first disk of each of said pairs to said second hinge member of each of said sets, said screws having extensions thereon forming said pins.

4. The hinge unit, as set forth in claim 3, further comprising compression springs mounted on said pins, and spring washers mounted on the ends of said pins, said springs acting at one end on said washers and at the other end on said second disk of each pair to press the same toward said first disk to engage said teeth on said disks with each other.

5. The hinge unit, as set forth in claim 1, further comprising at least one return spring connecting said bolt to said first hinge member of each of said sets which is adapted to be rigidly secured to said seat and tending to return said bolt to its original position.

6. The hinge unit, as set forth in claim 1, further comprising a casing formed by said first hinge member and having a collarlike hub enclosing said second disk associated with said rotary hub and having an arm for securing said casing to one of said parts forming said seat and said back rest, a cup-shaped member formed by said second hinge member surrounding said collarlike hub in a spaced relation thereto so as to form an intermediate space and being open toward said casing and secured to said rotary hub, said cup-shaped member having an outer diameter equal to that of said casing, an arm secured to said cup-shaped member for securing the same to the other part forming said seat and back rest, a torsion spring within said space between said collarlike hub and said cup-shaped member, one end of said torsion spring being secured to said casing and the other end to said cup-shaped member, said torsion spring tending to draw said back rest upwardly.

7. The hinge unit, as set forth in claim 1, further comprising a Bowden cable having a center wire and a flexible out conduit surrounding said wire, said second, axially slidable disk being secured to the end of said center wire, and said outer conduit being secured to said first hinge member.

8. The hinge unit, as set forth in claim 7, further comprising a single lever pivotably mounted on the seat, said Bowden cables of both of said sets of hinge members being connected to said lever for simultaneous actuation of both axially slidable disks.

9. A hinge unit for a seat with a pivotably adjustable and lockable back rest having two sides, comprising two sets of hinge members adapted to be secured to the two sides of said seat and of said back rest and forming two parts, a first member of each of said sets being secured to one of said parts and a second member being secured to another of said parts, pivoting means for connecting said two members of each of said sets, so as to be rotatable, but axially immovable relative to each other, said pivoting means of both of said sets extending coaxially relative to each other, a first locking member rigidly secured to one of said hinge members of each of said sets for each side of said seat, a bolt rotatably mounted in the other of said hinge members, so as to be axially immovable thereto and having coarse screw threads, a second locking member threadedly secured to said bolt, means for connecting said second locking member to the other of said hinge members, so as to permit said second locking member to move independently of said other of said hinge members along a plane extending through the common axis of said pivoting means of both of said sets of hinge members, whereby said locking members of each of said sets of hinge members may be engaged with and disengaged from each other respectively, and means for operatively connecting said locking members to each other.

10. The hinge unit, as set forth in claim 9, further comprising means for sliding said movable locking member in the direction of the common axis of said pivoting means of both of said hinge sets.

11. The hinge unit, as set forth in claim 9, further comprising means for sliding said movable locking member in a direction parallel to the common axis of said pivoting means of both of said hinge sets.

12. The hinge unit, as set forth in claim 9, in which said locking members are disposed coaxially to each other and comprise disks having teeth radially arranged on the sides facing toward each other, each of said teeth having a shape such that one flank thereof lies within a plane extending through the common axis of both of said locking members of each of said sets of hinge members.

13. The hinge unit, as set forth in claim 9, in which said locking members of each of said sets of hinge members form gear segments having teeth adapted to engage with each other, and said gear segments of each pair of said locking members associated with each other have different arcuate lengths.

14. The hinge unit, as set forth in claim 9, in which said fixed and movable locking members of each of said sets of hinge members when in their engaged position are disposed substantially within the same plane.

15. The hinge unit, as set forth in claim 14, in which said two locking members of each of said pairs comprise a spur gear and a curved rack having teeth adapted to engage with said spur gear.

16. The hinge unit, as set forth in claim 14, further comprising a cam slide member movable in the direction of a straight line intersecting said common axis of said pivoting means, for moving the movable locking member of each of said pairs.

17. The hinge unit, as set forth in claim 16, further comprising a guide member for slidably guiding said movable locking member of each pair in a direction parallel to said common axis of said pivoting means, said movable locking member having a channel therein extending at an inclined angle to the direction of movement of said cam slide member, the latter having a part bent at a corresponding angle extending within said channel, and a handle for shifting said cam slide member to a position in which said locking members of each of said pairs will be disengaged from each other, and a spring acting on said cam slide member tending to maintain said locking members in the engaged position.

18. The hinge unit, as set forth in claim 17, in which said cam slide member is bent at a right angle at its end facing away from said movable locking member, a bolt extending parallel to the direction of movement of said cam slide member, said bent end being slidably guided on said bolt, and a compression spring on said bolt and acting on said slide member and tending to maintain said slide member in its original position.

19. The hinge unit, as set forth in claim 9, in which said movable locking member of each of said pairs is pivotable about an axis intersecting said common axis of said pivoting means at a right angle thereto.

20. The hinge unit, as set forth in claim 19, further comprising a bolt, means for rotatably mounting said bolt on one of said hinge members to be connected to said seat, a handle on said bolt and radially projecting therefrom, said movable locking member being rigidly secured to said bolt, and a torsion spring mounted on said bolt and tending to move said movable locking member into engagement with the other of said locking members of each of said pairs.

21. The hinge unit, as set forth in claim 20, further comprising a rod slidably mounted within said sets and operatively connecting said movable locking members of both sets of said hinge members with each other and extending in a direction parallel to said common axis of said pivoting means, a control member mounted on said rod near one end thereof and having an inclined cam surface, an arm secured to said bolt of the second of said sets of hinge members and engaging with said inclined cam surface, and an arm secured to said bolt carrying said handle and associated with said first set of said hinge members, said last arm being adapted to act upon the end surface of the other end of said rod to transmit the movement of said bolt carrying said handle by means of said inclined surface on said control member for said other bolt.

22. The hinge unit, as set forth in claim 9, further comprising means for moving said movable locking members of both of said pairs in the same directions.

23. The hinge unit, as set forth in claim 9, further comprising means for moving said movable locking members of both of said pairs in opposite directions to each other.

References Cited in the file of this patent

UNITED STATES PATENTS

| | | |
|---|---|---|
| 842,404 | Kasch et al. | Jan. 29, 1907 |
| 2,744,566 | Schmidt | May 8, 1956 |
| 2,912,045 | Milly | Nov. 10, 1959 |

FOREIGN PATENTS

| | | |
|---|---|---|
| 727,335 | Great Britain | Mar. 30, 1955 |
| 510,360 | Italy | June 21, 1955 |
| 552,546 | Italy | Dec. 6, 1956 |